(12) United States Patent  (10) Patent No.: US 8,621,369 B2
Farris et al.  (45) Date of Patent: Dec. 31, 2013

(54) INTERCOM AND CHAT FOR HOME MEDIA NETWORK

(75) Inventors: Jack M. Farris, Randolph, NJ (US); Michael John Talbert, Nazareth, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 444 days.

(21) Appl. No.: 12/647,043

(22) Filed: Dec. 24, 2009

(65) Prior Publication Data

US 2011/0161839 A1 Jun. 30, 2011

(51) Int. Cl.
*G06F 3/00* (2006.01)

(52) U.S. Cl.
USPC .......................................................... 715/758

(58) Field of Classification Search
USPC ................. 715/753, 758; 725/37, 43, 78, 106
See application file for complete search history.

(56) References Cited

U.S. PATENT DOCUMENTS

| | | | | |
|---|---|---|---|---|
| 5,818,441 | A * | 10/1998 | Throckmorton et al. | 715/717 |
| 5,990,887 | A * | 11/1999 | Redpath et al. | 715/758 |
| 6,434,604 | B1 * | 8/2002 | Harada et al. | 709/207 |
| 6,628,302 | B2 * | 9/2003 | White et al. | 715/717 |
| 6,754,904 | B1 * | 6/2004 | Cooper et al. | 725/32 |
| 7,036,083 | B1 * | 4/2006 | Zenith | 715/758 |
| 7,343,561 | B1 * | 3/2008 | Stochosky et al. | 715/758 |
| 7,761,507 | B2 * | 7/2010 | Herf et al. | 709/204 |
| 7,805,487 | B1 * | 9/2010 | Isaacs et al. | 709/206 |
| 7,873,532 | B2 * | 1/2011 | Jones et al. | 705/7.42 |
| 8,312,500 | B2 * | 11/2012 | Emerson et al. | 725/131 |
| 2002/0174234 | A1 * | 11/2002 | Trovato et al. | 709/227 |
| 2003/0101450 | A1 * | 5/2003 | Davidsson et al. | 725/32 |
| 2004/0107439 | A1 * | 6/2004 | Hassell et al. | 725/44 |
| 2004/0117845 | A1 * | 6/2004 | Karaoguz et al. | 725/134 |
| 2005/0028208 | A1 * | 2/2005 | Ellis et al. | 725/58 |
| 2005/0262542 | A1 * | 11/2005 | DeWeese et al. | 725/106 |
| 2007/0162930 | A1 * | 7/2007 | Mickle et al. | 725/37 |
| 2008/0022322 | A1 * | 1/2008 | Grannan et al. | 725/78 |
| 2009/0113315 | A1 * | 4/2009 | Fisher et al. | 715/758 |
| 2009/0167839 | A1 * | 7/2009 | Ottmar | 348/14.08 |
| 2010/0146445 | A1 * | 6/2010 | Kraut | 715/821 |
| 2011/0107364 | A1 * | 5/2011 | Lajoie et al. | 725/25 |

FOREIGN PATENT DOCUMENTS

WO WO2004056119 * 7/2004 ............. H04N 7/24

* cited by examiner

*Primary Examiner* — Phenuel Salomon (57) ABSTRACT

A media client presents a menu interface for a media client intercom and receives, via the menu interface, a signal from a user to initiate an intercom message. The media client receives a message input from the user, where the message input is provided through the human interface device, and converts the message input into a digital format to create a digitized message. The digitized message is sent, exclusively via a home media network, to another media client within the home media network.

21 Claims, 9 Drawing Sheets

INTERCOM AND CHAT FOR HOME MEDIA NETWORK

BACKGROUND INFORMATION

Subscription television service providers, such as cable, satellite and fiber optic providers, use a network within a customer's premises (e.g., a home media network) to deliver content and services to a variety of customer equipment (e.g., multiple televisions, digital video recorders, computers, etc.) within the customer's premises. For example, a television service provider may provide television services to multiple televisions, and Internet services to multiple computers within the customer's premises.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription television service provider to offer intercom and/or chat functionality within a home media network. Intercom and/or chat features may be integrated within media clients (e.g., set-top boxes) in the home media network to facilitate intercom and/or chat features on display devices (e.g., televisions) associated with the media clients.

Figure 1:
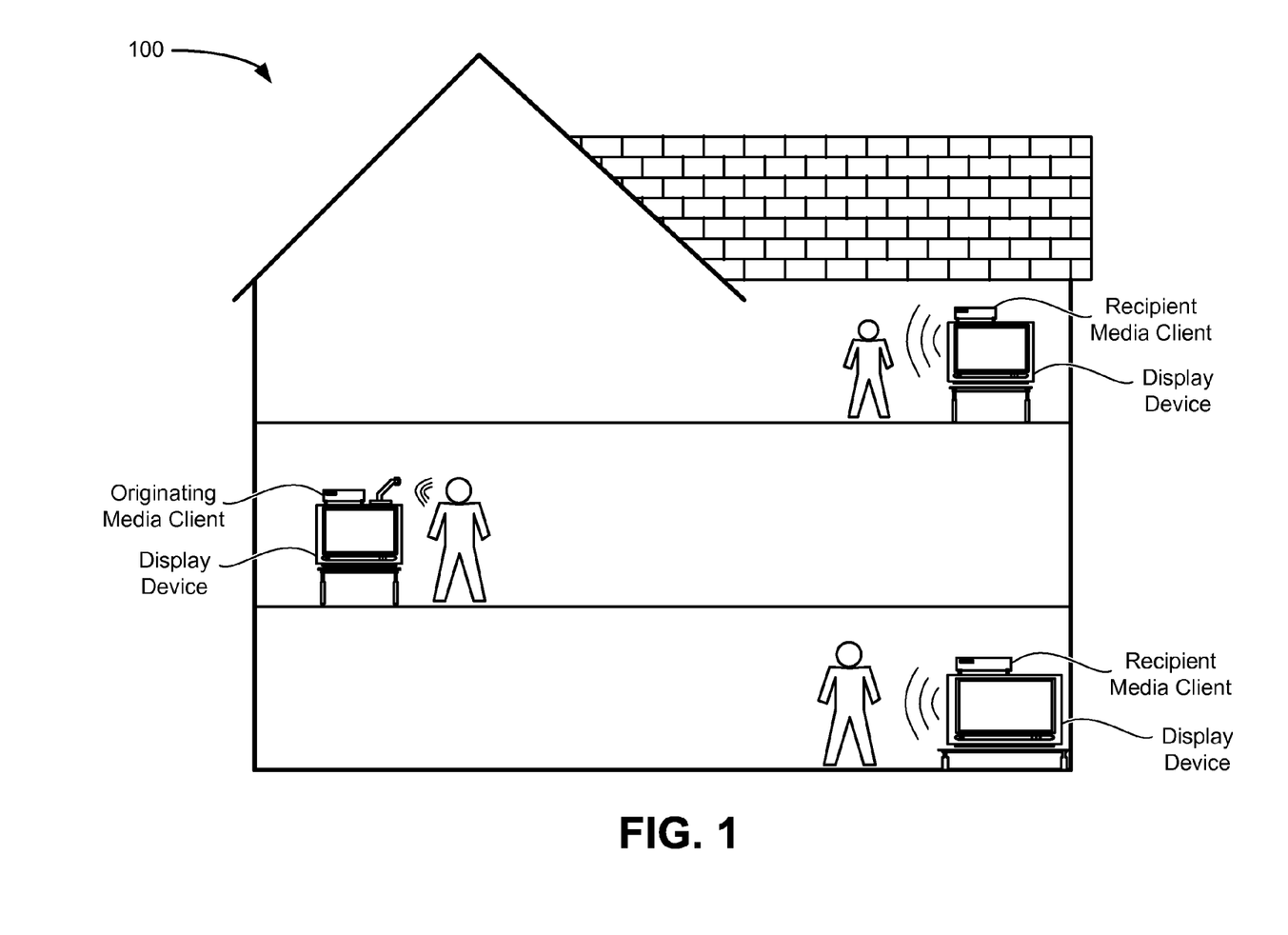
FIG. 1 is a diagram illustrating concepts described herein.

FIG. 1 provides an exemplary illustration of concepts described herein. As shown in FIG. 1, a customer's premises 100 may include display devices (e.g., televisions) in multiple locations. Each display device may be operatively connected to a media client that provides multimedia content to the display device. In implementations described herein, each of the media clients may be configured to exchange voice and/or data communications with each of the other of the media clients via a home media network. At least one of the media clients (e.g., an originating media client) may include, or be operatively connected to, a human interface device (HID), such as a microphone or a video camera. A person may enable the intercom feature on the originating media client and may select an intended recipient media client (or multiple recipient media clients). The HID may receive audio/video signals from the person, and the originating media client may convert the audio/video signals into digital signals that may be transmitted to the intended recipient media client(s). The recipient media client(s) may receive the digital signals via the home network and present (play) the audio/video using the display device associated with the respected recipient media client. In another implementation, systems and/or methods described herein may facilitate two-way voice communication between two originating media clients. Also, in other implementations, one-way or two-way text-based communications may be transmitted using, for example, a keyboard as a HID for each originating media client.

As used herein, the term "intercom message" may refer to a communication, from an originating media client to a recipient media client, that may include audio, video and/or text.

Figure 2:
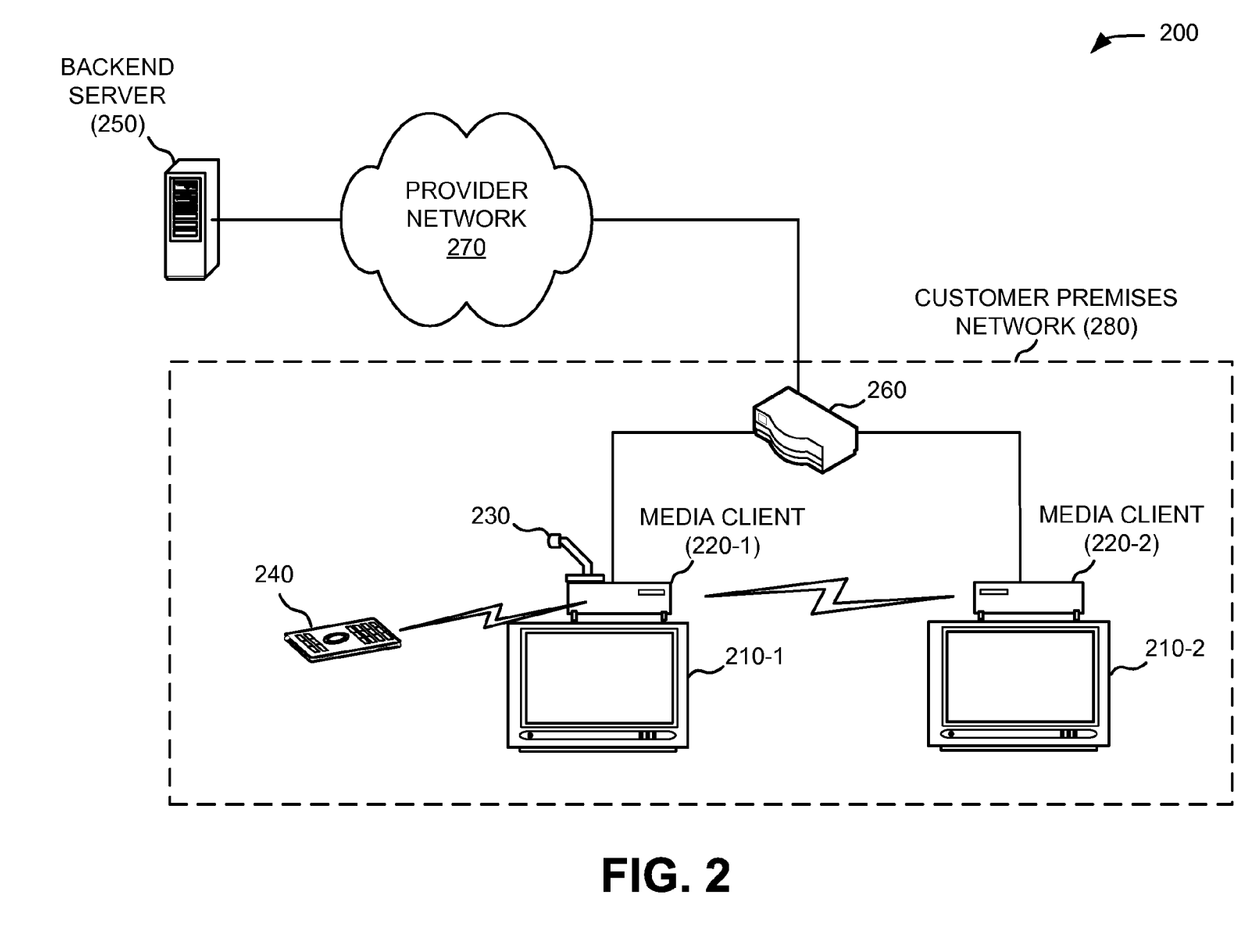
FIG. 2 depicts an exemplary network in which systems and/or methods described herein may be implemented.

FIG. 2 is a diagram of an exemplary network 200 in which systems and/or methods described herein may be implemented. As illustrated, network 200 may include multiple display devices 210-1 and 210-2 (herein referred to collectively as "display devices 210" and generically as "display device 210"), multiple media clients 220-1 and 220-2 (herein referred to collectively as "media clients 220" and generically as "media client 220"), a HID 230, a remote control 240, a backend server 250, a local gateway 260, a provider network 270, and a customer premises network 280. Components of network 200 may interconnect via wired and/or wireless connections. Two display devices 210, two media clients 220, one HID 230, one remote control 240, one backend server 250, one gateway 260, one provider network 270, and one customer premises network 280 have been illustrated in FIG. 2 for simplicity. In practice, there may be more display devices, media clients, video clients, remote controls, backend servers, gateways, provider networks, and/or customer premises network. Also, in some instances, one or more of the components of network 200 may perform one or more functions described as being performed by another one or more of the components of network 200.

Display device 210 may include any digital or analog display that is capable of presenting audio and/or video content provided by a media client 220 connected to display device 210. Display device 210 may include technologies, such as cathode ray tube (CRT) displays, liquid crystal displays (LCDs), light-emitting diode (LED) displays, plasma displays, etc. In one implementation, display device 210 may be a television.

Media client 220 may include any device capable of receiving, transmitting and/or processing information to and/or from another media client 220 within customer premises network 280. Media client 220 may also receive, transmit and/or process information to and/or from provider network 270. Media client 220 may provide video and/or audio signals to display device 210, and may include decoding and/or decryption capabilities. Media client 220 may also include a digital video recorder (DVR) (e.g., a hard drive). In some implementations, media client 220 may include a set-top box, a computer device, or a portable device (e.g., a mobile telephone or a personal digital assistant (PDA)). Media client 220 may be capable of providing interactive content (e.g., interactive menus, etc.) to a user via display device 210 that may be activated, for example, via a remote control (e.g., remote control 240). In one implementation, media client 220 may include a USB port or another interface that allows for the connection of peripheral devices, such as HID 230. Media client 220 may be capable of receiving input from a user via peripheral devices and transmitting the input to another media client using, for example, Internet Protocol (IP) formats.

HID 230 may include a device for receiving auditory, visual or text information from a user. HID 230 may include, for example, a microphone to receive audio signals and output electrical signals, a video camera to capture images, and/or a keyboard to input text. In one implementation, HID 230 may be a portable device. For example, HID 230 may include a handheld microphone, a remote control device having a microphone, or a headset or a clip-on microphone. HID 230 may connect to media client 230 in a wired or wireless manner. In one implementation, HID 230 may connect using a Bluetooth adaptor that may be physically connected to media client 230 (e.g., via a USB port). In still another implementation, HID 230 may include an adaptor for a cordless telephone, such as a digital enhanced cordless telecommunications (DECT) adaptor.

Remote control 240 may include a device that allows a user to control programming, applications, and/or content displayed on one or more of display devices 210 via interaction with media client 220. Remote control 240 may transmit signals, such as, for example, infrared signals, to a signal receiver associated with media client 220. In one implementation, remote control 240 may include programmable keys that may be programmed to launch particular applications, such as a media client intercom application. Any function, described herein, as being performed by remote control 240, may be performed directly on media client 220 using, for example, one or more buttons on media client 220.

Backend server 250 may include one or more server devices, or other types of computation or communication devices, that gather, process, search, and/or provide information in a manner described herein. In one implementation, backend server 250 may provide applications (e.g., software) and/or data to media clients 220 to support a media client intercom. In another implementation, backend server 250 may provide data storage and/or processing to facilitate media client intercom features. For example, backend server 250 may receive intercom messages from an originating media client 220, provide additional processing (e.g., speech-to-text conversion, re-formatting, etc.) and/or temporary storage, and send the intercom message to a recipient media client 220. In another implementation, backend server 250 may provide conversion and forwarding functions to allow legacy systems (e.g., media clients that do not support IP communications and/or communications via a home media network) to receive intercom messages.

Gateway 260 may include a network device that provides an interface from provider network 270 to media client 220 and/or other network connectivity devices (not shown). Gateway 260 may include one of a number of possible gateway devices, including a satellite antenna and receiver, a coaxial cable connection, an optical network terminal (ONT), or a broadband access for Internet Protocol TV (IPTV). For example, when telecommunication services are provided to the customer's premises via an optical fiber, gateway 260 may include an ONT that connects to the optical fiber. The ONT may convert between signals appropriate for display devices 210 and signals appropriate for transmission over optical fiber. The ONT may include a coaxial cable connection that leads to media clients 220. The ONT may also include an Ethernet output port that connects to a personal computer or a VoIP telephone and/or a standard telephone port for connecting to a standard telephone.

Provider network 270 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. Although shown as a single element in FIG. 2, network 270 may include a number of separate networks that function to provide services to devices, such as display devices 210, within customer premises network 280. In one implementation, network 270 may terminate at the customer's premises via an optical communication link, such as an optical fiber provided to the customer's premises. In another possible implementation, network 270 may terminate at the customer's premises via a coaxial cable. In still another implementation, network 270 may terminate at the customer's premises via a wireless (e.g., satellite) connection.

Customer premises network 280 may include display devices 210, media clients 220, HID 230, remote control 240, and local gateway 260. Customer premises network 280 may also include additional devices (not shown), such as local routers, personal computers, telephones, etc. Devices within customer premises network 280 may be connected via wired connections (e.g., coaxial cable or Ethernet connections) or wireless connections (e.g., using network devices such as those available under the IEEE 802.11 wireless LAN standards). In one implementation, customer premises network 280 may conform to guidelines from the Multimedia of Coax Alliance (MoCA). Customer premises network 280 may also be referred to herein as a home media network.

In an implementation described herein, a user may activate an intercom feature of media client 220 using, for example, remote control 240 and an interactive menu shown on display device 210-1. User input into HID 230 may be received by media client 220-1 and be directed as digital signals to media client 220-2 via customer premises network 280. Media client 220-2 may receive the digital signals and present the user input as an audio component via display device 210-2. Additionally, or alternatively, media client 220-2 may provide a visual component associated with the user input, such as an overlay to be displayed on display device 210-2. The visual component may include, for example, general information (e.g., "Intercom call from Basement TV," "Intercom in use", etc.) or a speech-to-text transcription.

In some implementations, additional features of the media client intercom within customer premises network 280 may be supported by backend server 250. As described further herein, backend server 250 may receive intercom messages, via provider network 270, from originating media client 220-1, provide additional processing, and send the processed intercom message to a recipient media client 220-2.

Figure 3:
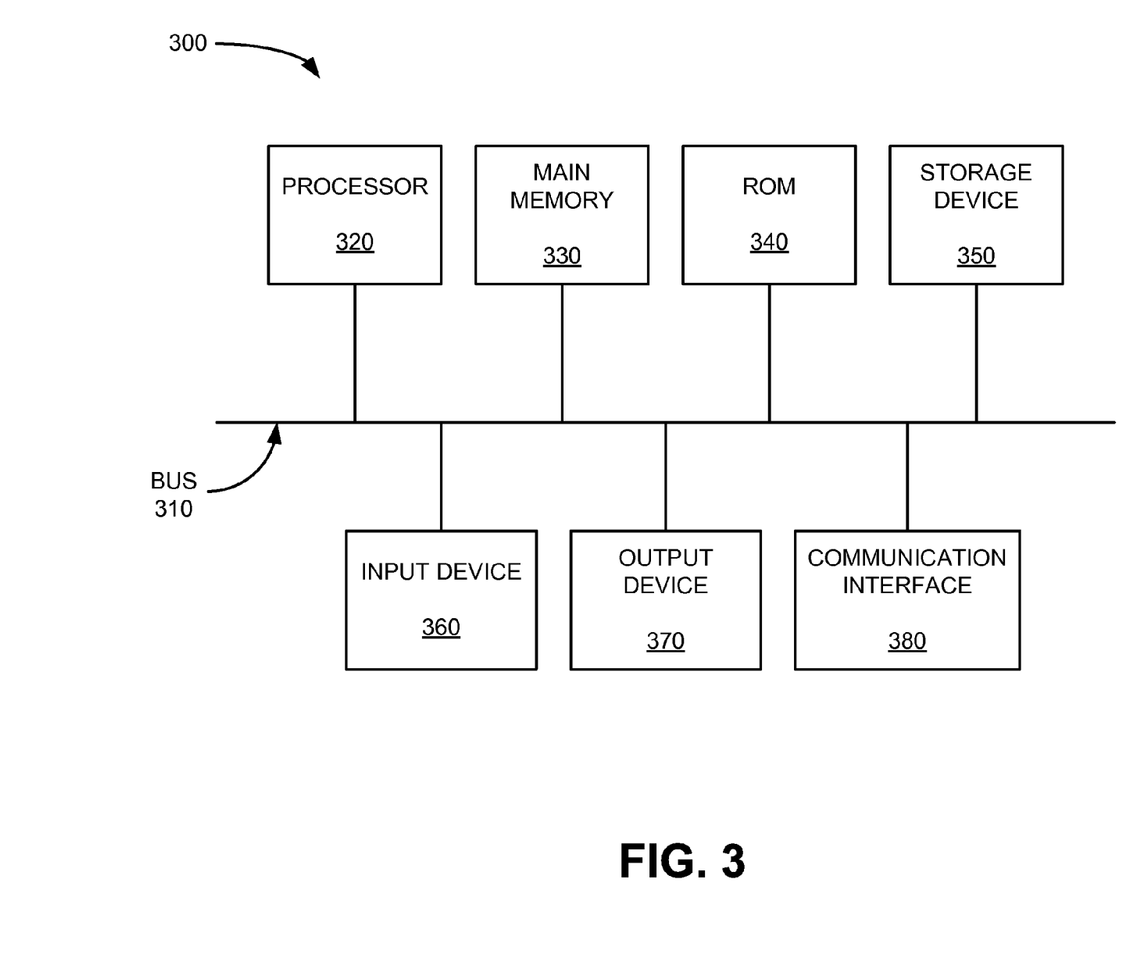
FIG. 3 is a block diagram of exemplary components of a media client that may be used in the network of FIG. 2.

FIG. 3 is an exemplary diagram of a device 300 that may correspond to media client 220 and/or backend server 250. As illustrated, device 300 may include a bus 310, a processor 320, a main memory 330, a read-only memory (ROM) 340, a storage device 350, an input device 360, an output device 370, and/or a communication interface 380. Bus 310 may include a path that permits communication among the components of device 300.

Processor 320 may include a processor, microprocessor, or a type of processing logic (e.g., an application-specific integrated circuit (ASIC) or field-programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and/or instructions for use by processor 320. Storage device 350 may include a magnetic and/or optical recording medium and its corresponding drive, or a type of flash memory. In one implementation (e.g., where device 300 corresponds to media client 220), storage device 350 may include a digital video recorder DVR.

Input device 360 may include a mechanism that permits an operator to input information to device 300, such as a keyboard, a mouse, a pen, a microphone, a button, voice recognition and/or biometric mechanisms, remote control 240, etc. Output device 370 may include a mechanism that outputs information to the operator, including a display, a speaker, a light-emitting diode (LED), etc. Communication interface 380 may include any transceiver-like mechanism that enables device 300 to communicate with other devices and/or systems. For example, communication interface 380 may include mechanisms for communicating with another device or system via a network, such as provider network 270 and/or customer premises network 280.

As described herein, device 300 may perform certain operations in response to processor 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via a communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently-arranged, or additional components than depicted in FIG. 3. Additionally, or alternatively, one or more components of device 300 may perform one or more other tasks described as being performed by one or more other components of device 300.

Figure 4:
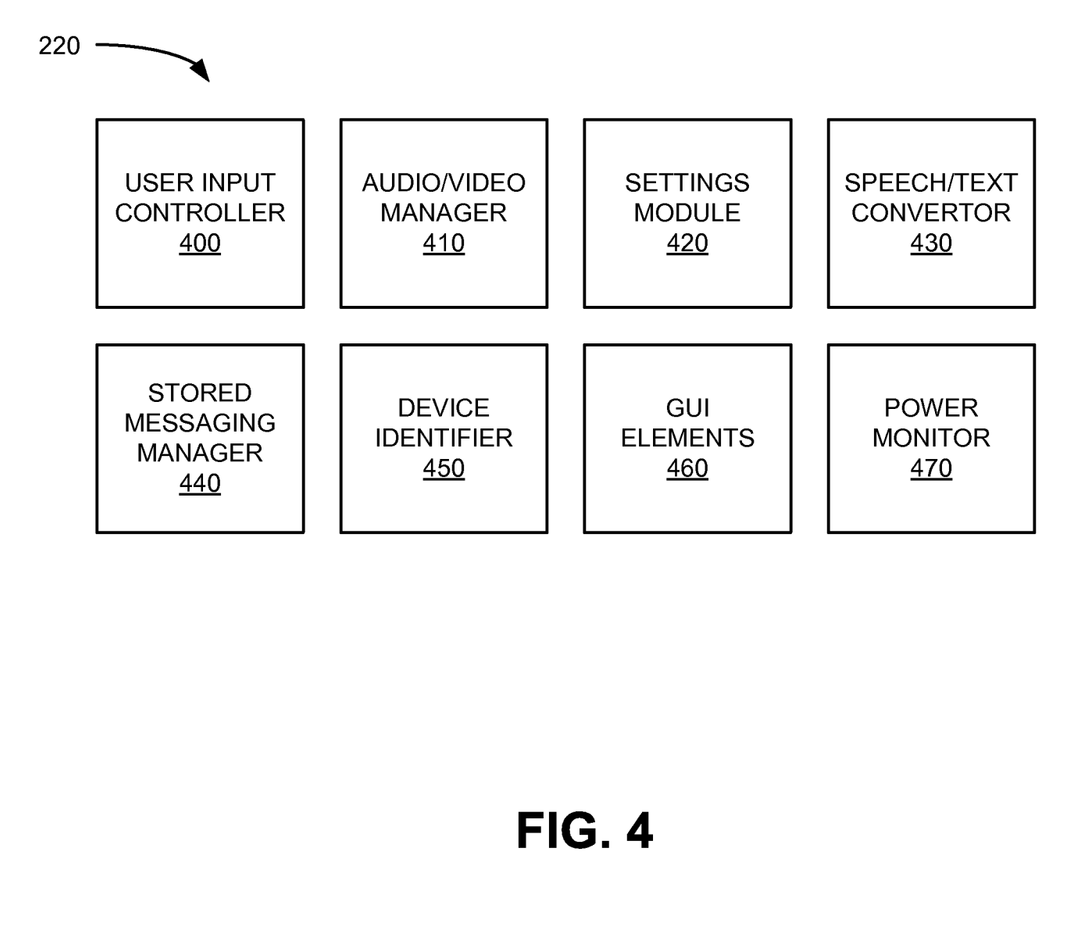
FIG. 4 is a diagram of exemplary functional components for the media client of FIG. 2.

FIG. 4 depicts a diagram of exemplary functional components of media client 220. As illustrated, media client 220 may include a user interface controller 400, an audio/video manager 410, a settings module 420, a speech/text convertor 430, a stored messaging manager 440, a device identifier 450, interface elements 460, and a power monitor 470. The functions described in FIG. 4 may be performed by one or more of the exemplary components of device 300 depicted in FIG. 3.

User interface controller 400 may include hardware or a combination of hardware and software to generate and update a graphical user interface for a media client intercom. In one implementation, user interface controller 400 may assemble interface elements (e.g., interface elements 460) based on one or more templates. User interface controller 400 may detect user inputs and provide intercom functionality based on the user inputs. For example, user interface controller 400 may detect initiation of a media client intercom application (e.g., via selection of a dedicated key on remote control 240 or through a selection of menu items in a general media client user interface) and a subsequent selection (e.g., of menu items via remote control 240) to initiate an intercom message (e.g., a selection for voice, text, or video message). User interface controller 400 may also allow a user to store settings, delete settings, and/or modify settings from settings module 420.

Audio/video manager 410 may include hardware or a combination of hardware and software to convert physical events or phenomena to digital signals that pertain to media client 220, and vice versa. For example, audio/video manager 410 may receive speech or other audible input from a user via HID 230 (e.g., if HID 230 includes a microphone). The signals from the microphone may be digitized and packetized for transport over customer premises network 280. At other times, digitized/packetized signals may be received by audio/video manager 410 which may then be converted and/or inserted into a media stream for audible presentation by display device 210. Similarly, audio/video manager 410 may receive video input from the user via HID 230 (e.g., if HID 230 includes a video camera). The signals from the video camera may be digitized and packetized for transport over customer premises network 280. Video signals received by audio/video manager may be converted and/or inserted into a media stream for presentation by display device 210.

Settings module 420 may include hardware or a combination of hardware and software to solicit user input and/or store user preferences regarding media client intercom features. In one implementation, settings module 420 may include a database or another memory component to store user settings. Settings modules 420 may include, for example, settings for access controls (e.g., passwords, voice recognition, etc.), parental controls (e.g., to enable/disable one-way or two-way intercom), default volume, presentation types (e.g., audio only, audio with on-screen display, speech-to-text conversion), presentation formats (e.g., font sizes, automatic pause of other media, automatic mute of other media), and the like. In one implementation, settings module 420 may obtain setting from a single media client 220 and deliver settings to other media clients 220 within customer premises network 280. For example, in the configuration of FIG. 2, a user of media client 220-1 may program settings for both media client 220-1 and 220-2. The settings for media client 220-2 may be different than the settings for media client 220-1.

Speech/text convertor 430 may include hardware or a combination of hardware and software to convert audible speech input to text and/or text input to audible speech. For example, speech/text convertor 430 may transcribe speech-based audio received by HID 230 (e.g., a microphone or video camera) using automatic speech recognition technology. For example, speech from a user of media client 220 may be received by a microphone. Then, the data may be transferred, such as by way of bus 310, to speech/text convertor 430 (e.g., processor 320 of FIG. 3). Speech/text convertor 430 may convert at least a portion of the speech data into text. Speech/text convertor 430 may operate under control of software stored in a memory (e.g., main memory 330) to convert speech to text and/or text into speech, in accordance with a predefined conversion algorithm. In one implementation, the converted text may be displayed/presented on display device 210 associated with the originating media client 220 (e.g., to preview before sending to a recipient media client 220). In another implementation, the converted text/speech may be sent to a recipient media client 220 via customer premises network 280.

Stored messaging manager 440 may include hardware or a combination of hardware and software to enable messages to be stored and presented at a selected time. For example, a user may select an option to record and store a message for presentation by the originating media client 220 and/or recipient media client(s) 220. Stored messaging manager 440 may store speech, video, or text from processed by audio/video manager 410 or converted speech/text from speech/text convertor 430. In one implementation, stored message manager 440 may temporarily store an intercom message at the originating media client 220 and transmit the stored message at a time set by the user. In another implementation, stored message manager 440 may attach presentation instructions to the intercom message (e.g., including a particular presentation time) and provide to a recipient media client 220 (e.g., stored messaging manager 440 on the recipient media client 220) for storage and eventual presentation. The stored message may be stored in a memory component (e.g., storage device 350). In another implementation, stored messaging manager 440 may store messages that are unable to be displayed (e.g., because display device 210 is powered off) until the message is able to be displayed (e.g., display device is powered up).

Device identifier 450 may include hardware or a combination of hardware and software to detect other media clients 220. For example, when a media client 220 is connected to customer premises network 280, the device identifier 450 may announce the capability to perform media client intercom functions. As another example, when an announcement is received from another media client 220, device identifier 450 may recognize that another media client 220 is functional on customer premises network 280. Device identifier 450 may then add the new media client to a list of available media clients on the intercom application interface. In one implementation, device identifier 450 may conform to the Digital Living Network Alliance (DLNA) guidelines. Device identifier may also enable media client 220 to support message delivery to a single recipient media client (e.g., unicast), selected multiple media clients (e.g., multicast), or all available media clients (e.g., broadcast).

Interface elements 460 may include templates, icons, menus and other graphical, audio, and/or text-based elements to facilitate user interaction with the media client intercom. In one implementation, interface elements 460 may include customizable features, such as pictures that may be associated with a particular user (e.g., based on an account log-in) or device (e.g., media client 220-1).

Power monitor 470 may include hardware or a combination of hardware and software to monitor availability of media clients 220 and/or display devices 210 used to support media client intercom features. For example, in one implementation power monitor 470 may activate media client 220 and/or display device 210 from a 'standby' mode upon receipt of an intercom message. In another implementation, power monitor 470 may cause media client 220 to present an indicator (e.g., a flashing light or a tone on media client 220) when an intercom message is available, but unable to be displayed.

Although FIG. 4 shows exemplary functional components of media client 220, in other implementations, media client 220 may contain fewer, different, or additional functional components than depicted in FIG. 4. Additionally, or alternatively, one or more functional components of media client 220 may perform one or more other tasks described as being performed by one or more other functional components of media client 220. Also, in some implementations, one or more functional components of FIG. 4 may be implemented by backend server 250. For example, aspects of speech/text convertor 430 and/or stored messaging manager 440 may be implemented by an originating media client 220 sending intercom messages to a recipient media client 220 via provider network 270 and backend server 250.

Figure 5:
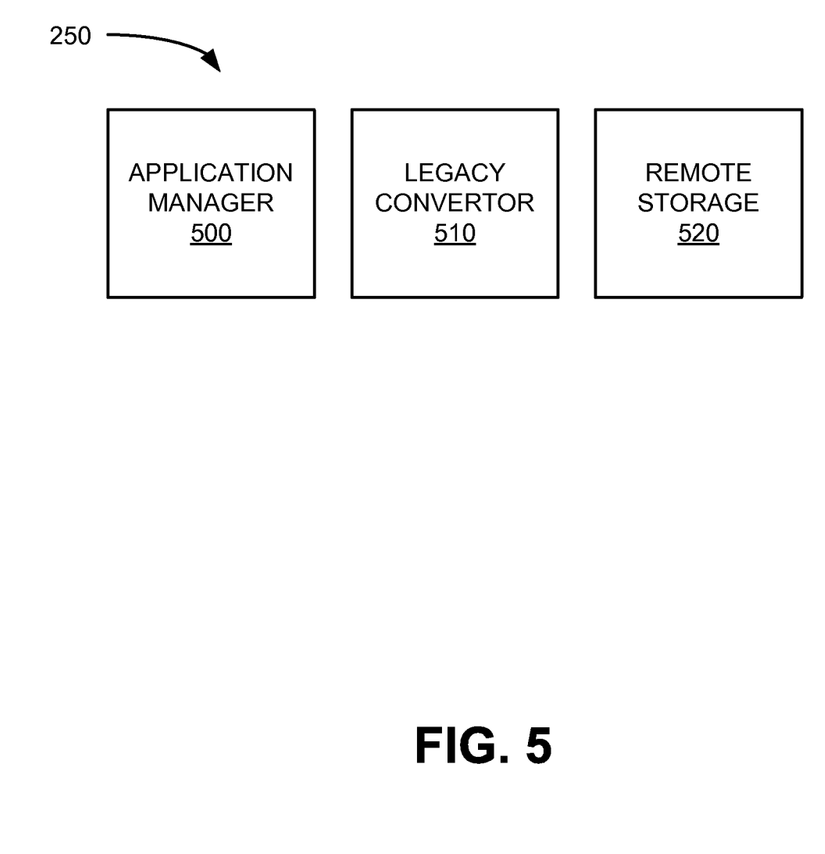
FIG. 5 is a diagram of exemplary functional components for the backend server of FIG. 2.

FIG. 5 depicts a diagram of exemplary functional components of backend server 250. As illustrated, backend server 250 may include an application manager 500, a legacy convertor 510, and a remote storage 520. The functions described in FIG. 5 may be performed by one or more of the exemplary components of device 300 depicted in FIG. 3.

Application manager 500 may include hardware or a combination of hardware and software to provide intercom applications and upgrades to media clients 220. For example, application manager 500 may provide upgrades or additional components for intercom functionality to media clients 220. In one implementation, applications and/or upgrades may be provided to media client 220 in-band via provider network 270. In another implementation, applications and/or upgrades may be provided out-of-band.

Legacy convertor 510 may include hardware or a combination of hardware and software to reformat and distribute intercom messages for recipient legacy media clients. For example, legacy convertor 510 may receive an intercom message from an originating media client 220 that is intended for a media client that lacks IP capability. Legacy convertor 510 may reformat the intercom message (if necessary) and send the intercom message to the intended recipient legacy media client. In one implementation, intercom messages for recipient legacy media clients may be provided from backend server 250 in-band via provider network 270. In another implementation, intercom messages for recipient legacy media clients may be provided out-of-band.

Remote storage 520 may include hardware or a combination of hardware and software to supplement and/or substitute functions of stored messaging manager 440 described above. For example, when either an originating media client or a recipient media client lacks sufficient memory capacity, remote storage 520 may store intercom messages designated for presentation at a later time. In another implementation, remote storage 520 may also provide DVR-type storage for programming on a recipient media client that may be interrupted by an intercom message. For example, when a recipient media client 220 (e.g., without a local DVR capability) is configured to automatically pause current programming when an intercom message is received, remote storage 520 may automatically record subsequent program content (e.g., using DVR functionality) during the period of the intercom message and resume programming from that point when the intercom message is complete.

Although FIG. 5 shows exemplary functional components of backend server 250, in other implementations, backend server 250 may contain fewer, different, or additional functional components than depicted in FIG. 5. Additionally, or alternatively, one or more functional components of backend server 250 may perform one or more other tasks described as being performed by one or more other functional components of backend server 250.

Figure 6:
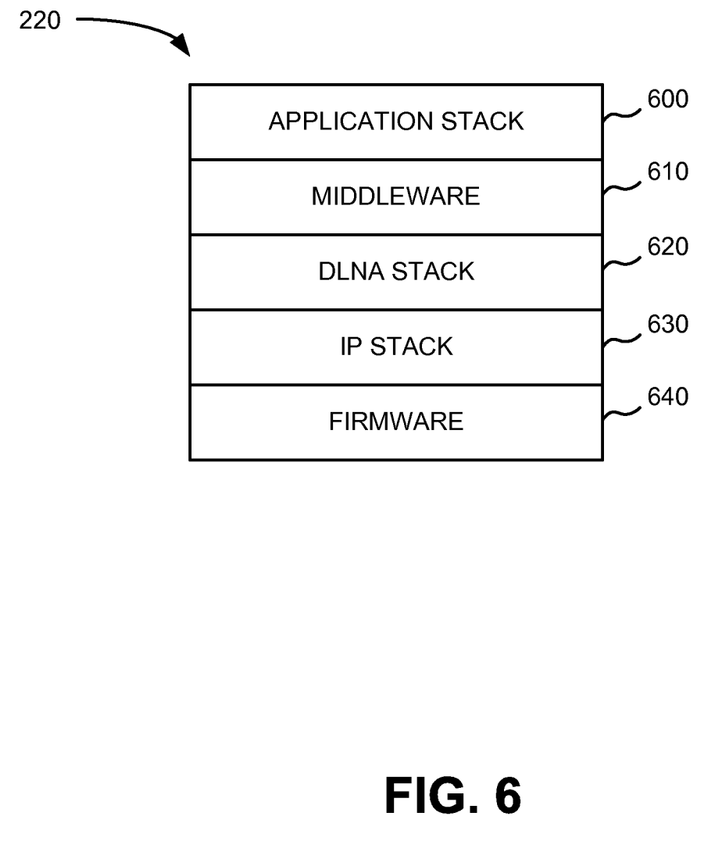
FIG. 6 provides an exemplary platform code architecture for the media client of FIG. 2 according to an implementation described herein.

FIG. 6 provides an exemplary platform code architecture for media client 220 according to an implementation described herein. As illustrated, media client 220 may include an application stack 610, a middle ware stack 620, a DLNA stack 630, an IP stack 640, and a firmware stack 650.

Application stack 600 may include one or more applications that generates packets (or other data units) to be transmitted to customer premises network 280 and/or processes packets received from customer premises network 280. Application stack 600 may allow users to activate and provide user input for media client intercom functions. Middleware 610 may include software components to connect applications so that data can be exchanged.

DLNA stack 620 may include the component to support DNLA guidelines. For example, each of the devices in customer premises network 280 may provide a basic set of functionalities for controlling and/or interacting with one another, transporting multimedia content, and/or presenting the multimedia content. Current DNLA guidelines do not allow for media client intercom traffic as described herein, but may be modified to accommodate such traffic. DLNA stack 620 may be included in the platform code of media client 220 so that middleware 610 may be able to reference intercom communications (inbound or outbound) and pass appropriate trigger information to application stack 600.

IP stack 630 may include the Internet Protocol. When sending packets, IP stack 630 may determine how to get the packets to their destination. When receiving packets, IP stack 630 may determine where the packets belong. Firmware 640 may include hardware or a combination of hardware and software that includes general instructions regarding the processing of a display of multimedia content (including intercom communications).

Although FIG. 6 shows an exemplary platform code architecture of media client 220, in other implementations, the platform code architecture media client 220 may contain fewer, different, differently arranged, or additional platform elements than depicted in FIG. 6. Additionally, or alternatively, one or more platform elements of media client 220 may perform one or more other tasks described as being performed by one or more other platform elements of media client 220.

Figure 7:
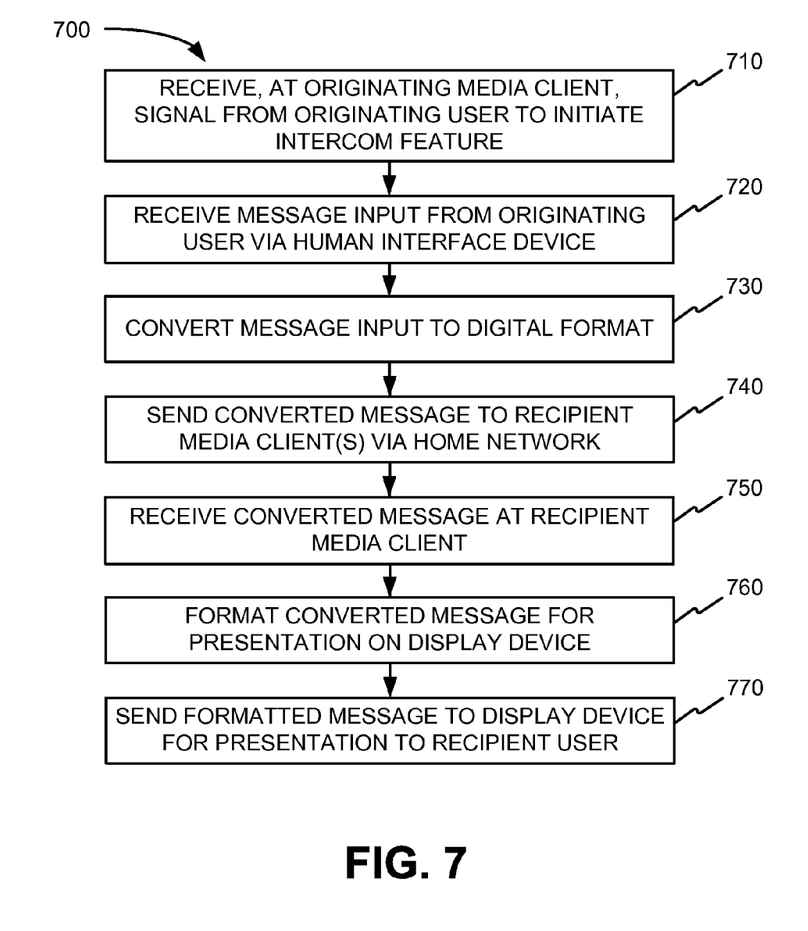
FIG. 7 provides a process flow illustrating exemplary operations for providing intercom functionality between media clients via a customer premises network.

FIG. 7 provides a process flow 700 illustrating exemplary operations for providing intercom functionality between media clients via customer premises network 280. In one implementation, the operations of process flow 700 may be performed by one or more media clients 220 associated with a subscription multimedia service. In another implementation, some or all of the operations of process flow 700 may be performed by another device or group of devices in conjunction with one or more media clients 220, such as backend server 250.

Figure 8A:
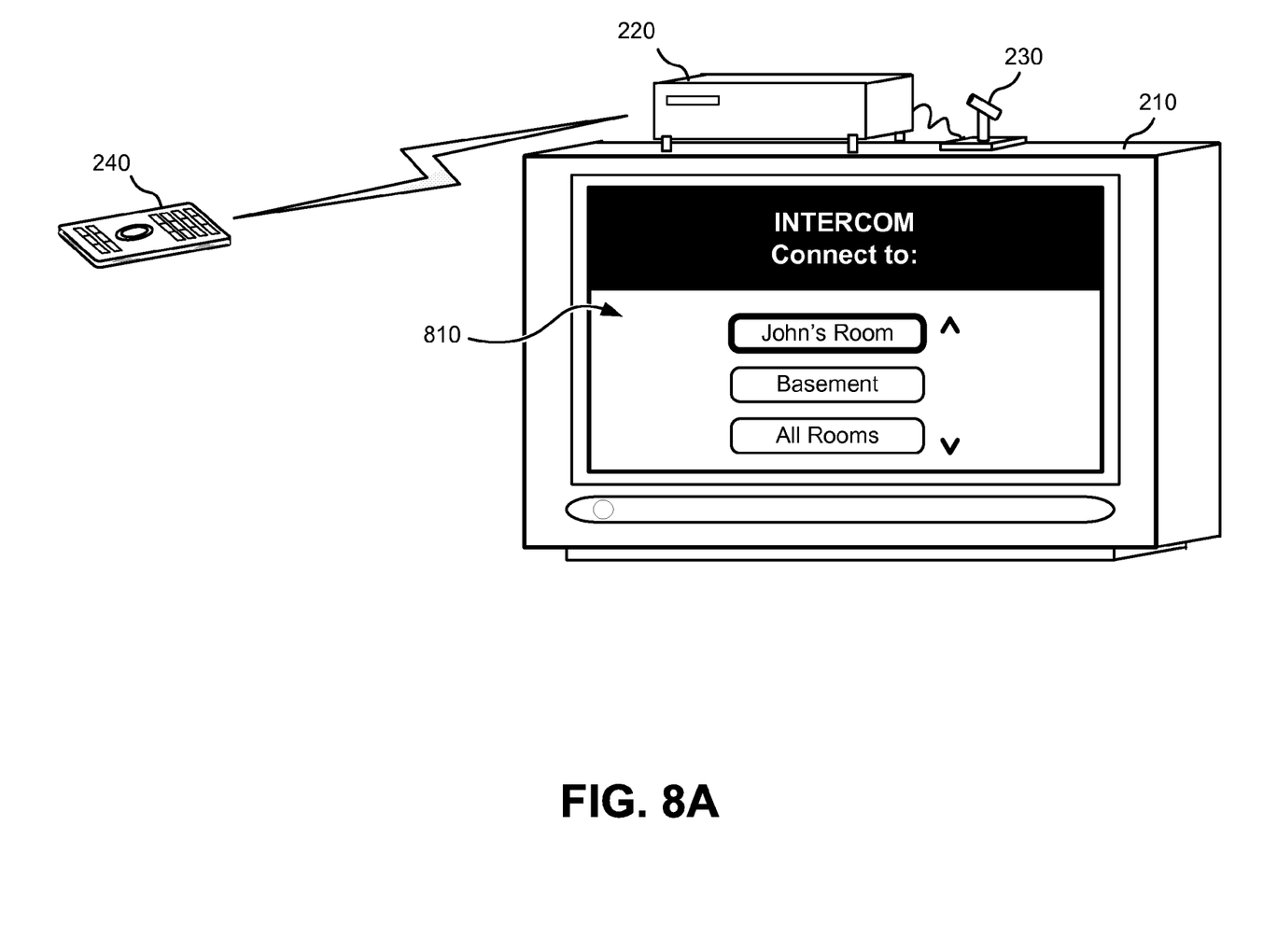
FIGS. 8A and 8B are exemplary diagrams illustrating implementations of a customer interface for a media client intercom.

Process 700 may include receiving, at an originating media client, a signal from an originating user to initiate an intercom feature (block 710) and receiving a message input from the originating user via a human interface device (block 720). For example, an originating media client 220 may receive a user's signal (e.g., from remote control 240) to activate an intercom feature of media client 220. FIG. 8A provides an exemplary diagram illustrating an implementation of an originator user interface for a media client intercom. As shown in FIG. 8A, the signal from remote control 240 may cause originating media client 220 to display, on display device 210 associated with the originating media client 220, a menu of available intercom options. Menu options may include, for example, a list 810 of recipient media clients 220 or groups of media clients 220 that may be available to receive an intercom message. A user may select an intended recipient or recipient group and provide, via HID 230, a message to be sent to the selected recipient or recipient group. User message input may vary depending on a type of input supported by HID 230. Exemplary message input formats may include voice (e.g., if HID 230 includes a microphone), video (e.g., if HID 230 includes a video camera), and/or text (if HID 230 includes a keyboard).

Returning to FIG. 7, the message input may be converted to digital format (block 730) and the converted message sent to one or more recipient media clients via a home network (block 740). For example, depending on the type of user input, originating media client 220 may convert the input signal from HID 230 to a format suitable for transmission via IP, such as VoIP, video conferencing over IP (e.g., MPEG-4 streams as defined by the Moving Picture Experts Group (MPEG)), or text messaging. The IP-formatted information may then be sent via customer premises network 280 toward the selected recipient media client(s) 220. In one implementation, the IP-formatted information may be sent from the originating media client 220 to a recipient media client exclusively within the customer premises network 280 (e.g., without use of backend server 250 or provider network 270).

The converted message may be received at the one or more recipient media clients (block 750) and the converted message may be formatted for presentation on a display device (block 760). For example, a recipient media client 220 may receive the IP message from the originating media client 220. The signal may be converted (if necessary) into a format suitable for presentation on a display device 210 associated with the recipient media client 220. For example, recipient media client 220 may decompress a VoIP stream (e.g., an MPEG-4 stream) for presentation through speakers associated with display device 210. In one implementation, recipient media client 220 may also retrieve a display element (e.g., an overlay, banner, etc.) that may visually indicate information about the intercom message.

Figure 8B:
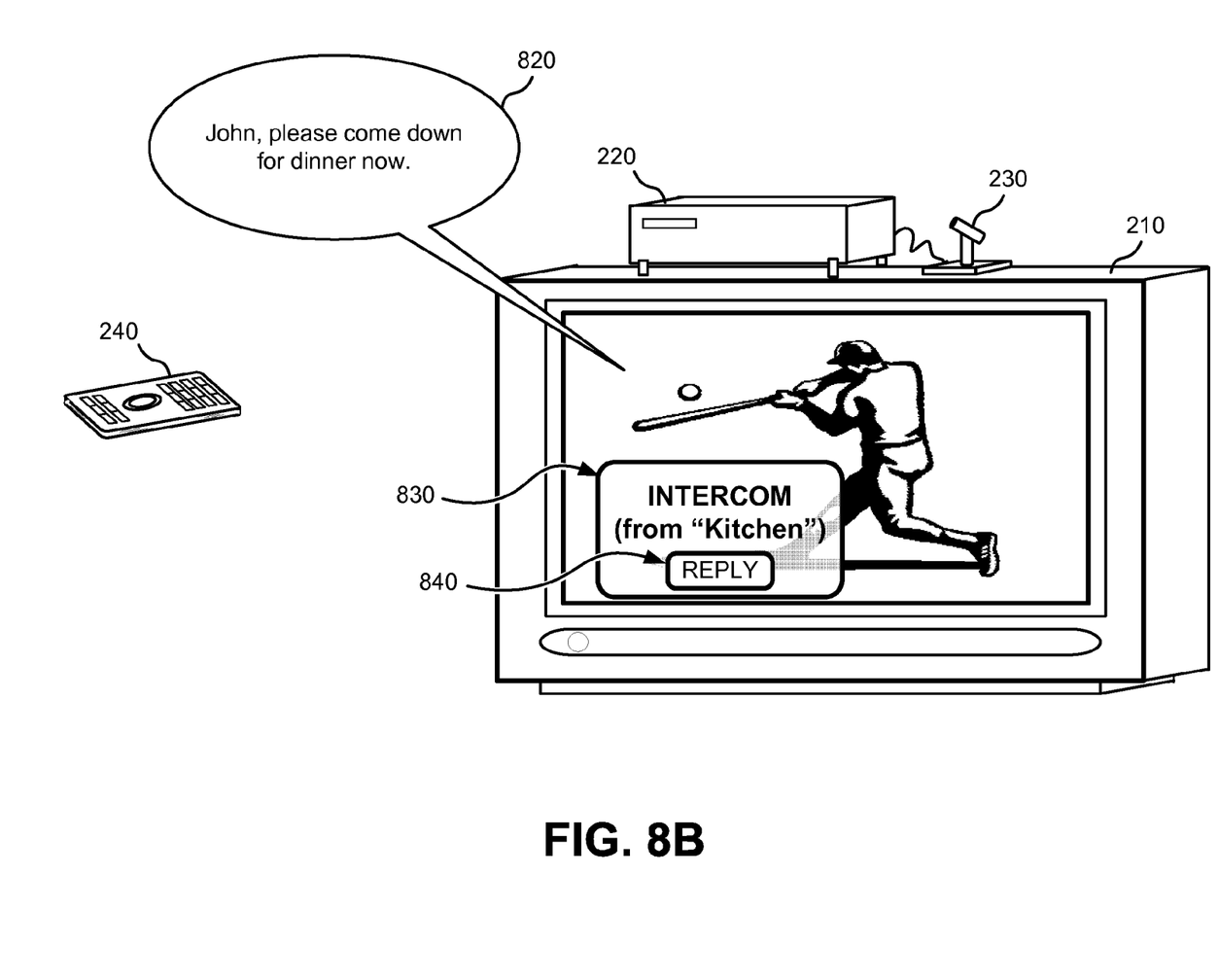

The formatted message may be sent to the display device for presentation to a recipient user (block 770). For example, recipient media client 220 may cause display device 210 to present audio and/or visual information to a user. FIG. 8B provides an exemplary diagram illustrating an implementation of a recipient user interface for a media client intercom. As shown in FIG. 8B, recipient display device 210 may present audible information 820 and/or visual information 830 as instructed by recipient media client 220. Audible information 820 may include, for example, a voice message from the originating media client 220. In one implementation, media client 220 may substitute audible information 820 for the audio portion of current programming being presented on display device 220. In another implementation, audible information may be presented simultaneously with current programming (e.g., at a volume higher than the current programming).

Still referring to FIG. 8B, in one implementation, visual information 830 may include information to supplement audible information 820. For example, as shown in FIG. 8B, visual information 830 may include an indication that an intercom message from a particular source (e.g., a media client 220 in the kitchen) is being presented. In one implementation, visual information 830 may also include an interactive menu item 840 to allow a user at recipient media client 220 to reply to the received message. For example, by the user selecting interactive menu item 840 (via remote control 240), the recipient media client 220 may act as an originating media client in generating a new intercom message. In another implementation, visual information 830 may include a speech-to-text conversion and/or a video component of the intercom message. Visual information 830 may be presented simultaneously with any current programming displayed on display device 210 (e.g., as an overlay or banner). Additionally, or alternatively, media client 220 may automatically pause any current programming and automatically record subsequent program content (e.g., using DVR functionality) so as to gracefully resume the program after the intercom message is complete.

The illustrations of FIGS. 8A and 8B are exemplary formats of user interfaces for a media client intercom. Other formats may be used.

Systems and/or methods described herein may present, on a display device associated with a media client, a menu interface for a media client intercom and may receive a signal from a user, via the menu interface, to initiate an intercom message. The media client may receive a message input from the user, where the message input is provided through a human interface device, and may convert the message input into a digital format to create a digitized message. The digitized message may be sent, exclusively via a home media network, to another media client within the home media network.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to FIG. 7, the order of the blocks may be modified in other implementations. Further, non-dependent acts may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    receiving, by a first set-top box within a home media network, an announcement that announces a capability of a second set-top box to perform intercom functions via the home media network;
    recognizing, by the first set-top box and based on the announcement, that the second set-top box is functional via the home media network;
    receiving, by the first set-top box and after recognizing that the second set-top box is functional via the home media network, a signal from a user, of the first set-top box, to initiate an intercom message to the second set-top box;
    receiving, by the first set-top box and after receiving the signal to initiate the intercom message, a message input for the intercom message,
        the message input being provided to the first set-top box by a human interface device associated with the first set-top box;
    sending, by the first set-top box and via the home media network, the intercom message, based on the message input, to the second set-top box;
    receiving, by the first set-top box, another intercom message;
    formatting, by the first set-top box, the other intercom message for presentation by a presentation device associated with the first set-top box to obtain a formatted presentation; and
    sending, by the first set-top box, the formatted presentation to the presentation device associated with the first set-top box.

2. The method of claim 1, further comprising:
    providing for presentation, on a display device associated with the first set-top box and after receiving the signal, a user interface for an intercom application,
        the presentation device including the display device,
        the user interface comprising a list of one or more set-top boxes within the home media network that are available to receive the intercom message, and
        the one or more set-top boxes comprising the second set-top box; and
    receiving, by the first set-top box and from the user, information regarding a selection of the second set-top box from the list of the one or more set-top boxes.

3. The method of claim 1, wherein sending the intercom message to the second set-top box includes:
    sending, exclusively via the home media network, the intercom message as an Internet Protocol (IP) transmission from the first set-top box to the second set-top box.

4. The method of claim 1, further comprising:
    receiving, by the second set-top box, the intercom message;
    formatting, by the second set-top box, the intercom message for presentation by a display device associated with the second set-top box to obtain another formatted presentation; and
    sending, by the second set-top box, the other formatted presentation to the display device associated with the second set-top box.

5. The method of claim 4, wherein formatting the intercom message for presentation by the display device associated with the second set-top box includes:
    retrieving a display element,
    inserting at least a portion of visual information associated with the intercom message into the display element, and
    associating the display element with an audio component of the intercom message.

6. The method of claim 4, further comprising:
    pausing, by the second set-top box, presentation of a program being presented on the display device at a first time at which the other formatted presentation is sent to the display device;
    recording, by the second set-top box, content of the program from the first time to a second time; and
    resuming, by the second set-top box, the presentation of the program at the second time based on the recorded content.

7. The method of claim 1,
    wherein the message input includes a voice component, and
    wherein the method further includes:
        generating the intercom message by converting the voice component into text by using automatic speech recognition.

8. A first set-top box comprising:
    one or more processors to:
        receive a signal from a user to initiate an intercom message to a second set-top box within a home media network associated with the first set-top box;
        receive a message input, for the intercom message, from the user,
            the message input being provided to the first set-top box through a human interface device;
        convert the message input into a digital format to create a first digitized message;
        send, exclusively via the home media network, the first digitized message to the second set-top box;
        receive, exclusively via the home media network, a second digitized message from the second set-top box;
        present information based on the second digitized message;
        record content of a program that is paused during the presentation of the information; and present the content after completing the presentation of the information.

9. The first set-top box of claim 8, wherein the second set-top box is connected to a television that outputs the first digitized message.

10. The first set-top box of claim 8, wherein, when sending, exclusively via the home media network, the first digitized message to the second set-top box, the one or more processors are to:
   transmit the first digitized message via an Internet Protocol.

11. The first set-top box of claim 8, wherein the one or more processors are further to:
   receive another digitized message,
   format the other digitized message for presentation on a display device to create a formatted presentation, and
   send the formatted presentation to the display device.

12. The first set-top box of claim 11,
   wherein the one or more processors are further to:
      activate at least one of the first set-top box or the display device from a standby mode upon receipt of the other digitized message.

13. The first set-top box of claim 11, wherein the one or more processors are further to:
   temporarily store the other digitized message based on instructions associated with the other digitized message.

14. The first set-top box of claim 11, wherein, when formatting the other digitized message, the one or more processors are to:
   generate display information that includes visual information associated with the other digitized message, and
   include the display information in the formatted presentation.

15. The first set-top box of claim 8, wherein, when sending, exclusively via the home media network, the first digitized message to the second set-top box, the one or more processors are to:
   send the first digitized message to a plurality of set-top boxes within the home media network,
      the plurality of set-top boxes including the second set-top box.

16. The first set-top box of claim 15, wherein the first digitized message is sent as one of:
   a multicast message, or
   a broadcast message.

17. A non-transitory computer-readable medium storing instructions, the instructions comprising:
   one or more instructions that, when executed by at least one processor of a first set-top box within a home media network, cause the at least one processor to:
      receive an announcement that announces a capability of a second set-top box to perform intercom functions via the home media network;
      recognize that the second set-top box is functional via the home media network;
      receive, after recognizing that the second set-top box is functional via the home media network, a signal to initiate an intercom message to the second set-top box;
      receive, after receiving the signal to initiate the intercom message, audio input, for the intercom message, from a human interface device that receives the audio input from a user;
      send, via the home media network, the intercom message to the second set-top box;
      receive another intercom message;
      format, to obtain a formatted presentation, the other intercom message for presentation by a presentation device associated with the first set-top box; and
      send the formatted presentation to the presentation device associated with the second set-top box.

18. The non-transitory computer-readable medium of claim 17, where the one or more instructions to receive the signal from the user to initiate the intercom message include:
   one or more instructions that, when executed by the at least one processor of the first set-top box, cause the at least one processor to:
      receive the signal from a remote control that includes a key for initiating an intercom application that initiates the intercom message,
      receive, via the intercom application, a type of the intercom message, and
      initiate the intercom message based on the type.

19. The non-transitory computer-readable medium of claim 17, where the instructions further comprise:
   one or more instructions that, when executed by the at least one processor of the first set-top box, cause the at least one processor to:
      convert the audio input into a digitized message,
         the digitized message being in a format that is suitable for transmission via the home media network; and
      generate the intercom message based on the digitized message.

20. The non-transitory computer-readable medium of claim 17, where the instructions further comprise:
   one or more instructions that, when executed by the at least one processor of the first set-top box, cause the at least one processor to:
      transcribe at least a portion of the audio input into text;
      provide for presentation the text on a display device associated with the first set-top box; and
      generate the intercom message based on the audio input and the text.

21. The non-transitory computer-readable medium of claim 17, where the instructions further comprise:
   one or more instructions that, when executed by the at least one processor of the first set-top box, cause the at least one processor to:
      receive, before receiving the signal, another announcement from the second set-top box,
         the other announcement indicating that the second set-top box is capable of receiving intercom messages via the home media network; and
      add, based on the announcement, an identifier of the second set-top box to a list of set-top boxes that are available.

* * * * *